United States Patent [19]
Weiss

[11] 3,913,230
[45] Oct. 21, 1975

[54] DENTAL SETUP GUIDE AND DIAGNOSTIC INSTRUMENT

[76] Inventor: Harry Weiss, 612 S. Center St., Orange, N.J. 07050

[22] Filed: May 24, 1974

[21] Appl. No.: 472,986

[52] U.S. Cl. ................................................ 32/32
[51] Int. Cl.² ........................................ A61C 11/00
[58] Field of Search ................................. 32/32, 19

[56] References Cited
UNITED STATES PATENTS

| | | | |
|---|---|---|---|
| 2,613,440 | 10/1952 | Murray et al. | 32/32 |
| 2,748,481 | 6/1956 | Glueck | 32/32 |
| 3,465,443 | 9/1969 | Schwartz et al. | 32/32 |

*Primary Examiner*—Robert Peshock
*Attorney, Agent, or Firm*—Harry B. Rook

[57] ABSTRACT

A dental setup and diagnostic instrument includes a platform vertically movably mounted on a frame and having a flat upper surface to support a dental cast. The frame has horizontally spaced and alined bearing seats above the platform to removably and pivotally support the pivot trunnions of the upper member of a dental articulator, permitting said member to swing downwardly toward and upwardly away from the platform. A mounting jig has an index pin and a crossbar to be separably secured by dental sticky wax to the Papilla and the Hamular notches, respectively, of a dental cast; and the jig also has a stud coaxial with said index pin removably insertable into a hole in the platform to locate the dental cast on the platform for proper horizontal positioning of the cast on the upper member of an articulator when the assembled cast and jig are set on the platform.

10 Claims, 6 Drawing Figures

DENTAL SETUP GUIDE AND DIAGNOSTIC INSTRUMENT

BACKGROUND OF THE INVENTION

This invention relates to an instrument or appliance to be employed particularly with the simple dental articulators most widely used by the dental profession and dental laboratories, for diagnosing and constructing prosthetic devices. The simple articulator comprises lower and upper members having a hinge action to simulate the action of the lower jaw, the two members being separable.

According to common practice, dental casts or models have been mounted in conventional simple articulators by sight and guess, and the present invention provides an instrument or appliance for the purpose of mechanically and accurately locating and thereafter securing the maxillary or upper dental cast in the proper position horizontally on the upper member of any known type of simple articulator for use by the dentist in known manner with the lower member of the articulator.

However, the invention also contemplates the use of the instrument with most of the more sophisticated anatomical articulators such as the Hanau articulator, by attaching to the instrument an appropriate adaptor to mount the instrument on the lower member of the articulator. With these articulators there are accepted methods for mounting the upper cast in proper position involving the use of so-called face bow transfer, but the present invention is useful when the dentist does not desire to use the face bow transfer, although the invention does not itself provide for properly relating the cast to the condyles.

The instrument embodying the invention is also useful in utilizing the records obtained from diagnostic casts or study models for the purpose of:

a. changing planes to improve occlusal harmony;
b. recording the length and extent of protusion of anterior teeth to facilitate the replacement of teeth;
c. using a diagnostic cast to record the position of natural teeth and facilitate the duplication of the teeth on a completely edentulous dental cast when constructing artificial dentures.
d. use as a guide for the setting up of teeth on full upper and lower dentures in a completely edentulous mouth for proper horizontal plane position of anterior and posterior teeth and for the anterior protrusion and the buco-lingual position of the posterior teeth.
e. use as a guide when constructing complete rehabilitation cases on the maxila (upper) in fixed crown and bridge work, in conjunction with a diagnostic cast to determine the proper horizontal plane and the vertical and protrusive position of the anterior teeth.

SUMMARY OF THE INVENTION

To accomplish the foregoing purposes among others which will appear hereinafter, the invention provides an instrument or appliance which comprises a main or stationary platform mounted on legs and having vertically adjustably mounted thereon a horizontal setup platform to coact with the upper member of an articulator which is separably and hingedly supported on uprights or posts projecting upwardly from the main platform to have mounted thereon a cast originally set up on the movable setup platform.

The dental profession accepts the theory that the hamular notches and the anterior or incisive papilla are in a horizontal constant in a normal mouth, and in accordance with the invention these "landmarks" are used in constructing a jig having means for separable attachment to the anterior papilla and to the hamular notches of a dental cast and having means separably cooperative with means on the platform for initial setup of the jig and the cast on the platform, providing for mounting the cast in a proper or desired horizontal position on the upper member of a simple articulator.

The setup platform has gauge marks, preferably in millimeters, correlated to said jig setup means to measure the distance from the anterior papilla to the incisal edge of the front teeth.

Also, one of said posts and said setup platform have correlated gauge marks to indicate the distance of elevation of the setup platform.

BRIEF DESCRIPTION OF THE DRAWINGS

For a more complete understanding of the invention, reference should be had to the following descriptions and accompanying drawings in which

FIG. 3 is a partial vertical sectional and partial rear elevational view of the instrument as indicated by the line 3—3 of FIG. 1;

DESCRIPTION OF THE PREFERRED EMBODIMENT

Figure 1:
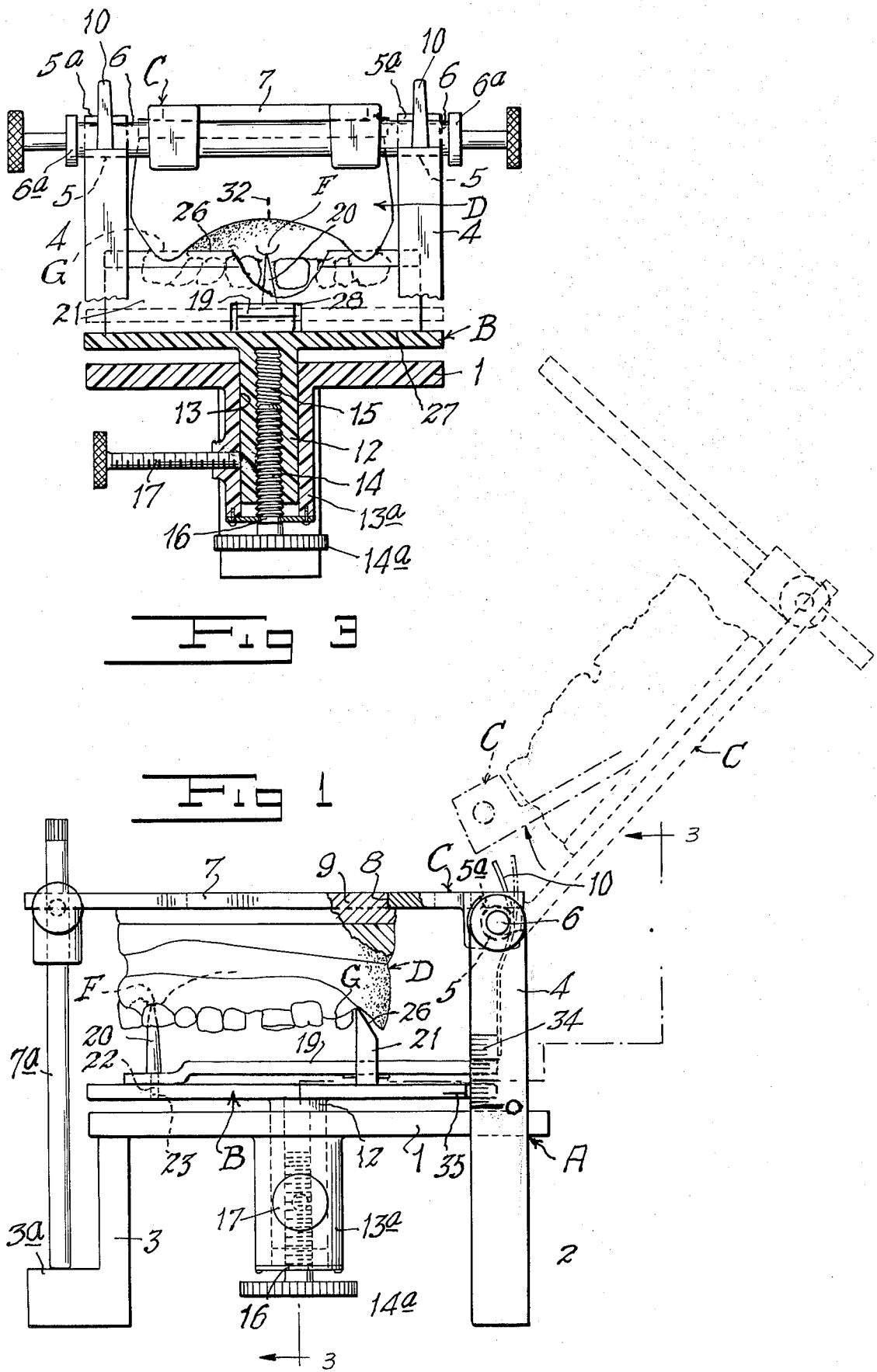
FIG. 1 is a side elevation of an instrument or appliance embodying the invention showing a dental cast setup on the vertical movable setup platform and attached to the upper member of an articulator which may be swung upwardly as shown by dotted lines and may be separated or detached from the instrument as indicated by dot and dash lines.

Specifically describing the invention and with references to the drawings, the instrument comprises a frame generally denoted A which has a main platform 1 supported on two rear legs 2 and a front leg 3 and on which is vertically adjustably mounted a horizontal setup platform B having a flat surface to serve as a support table for a dental cast one example of which is illustrated by light lines in the drawings and indicated by the reference character D.

Figure 2:
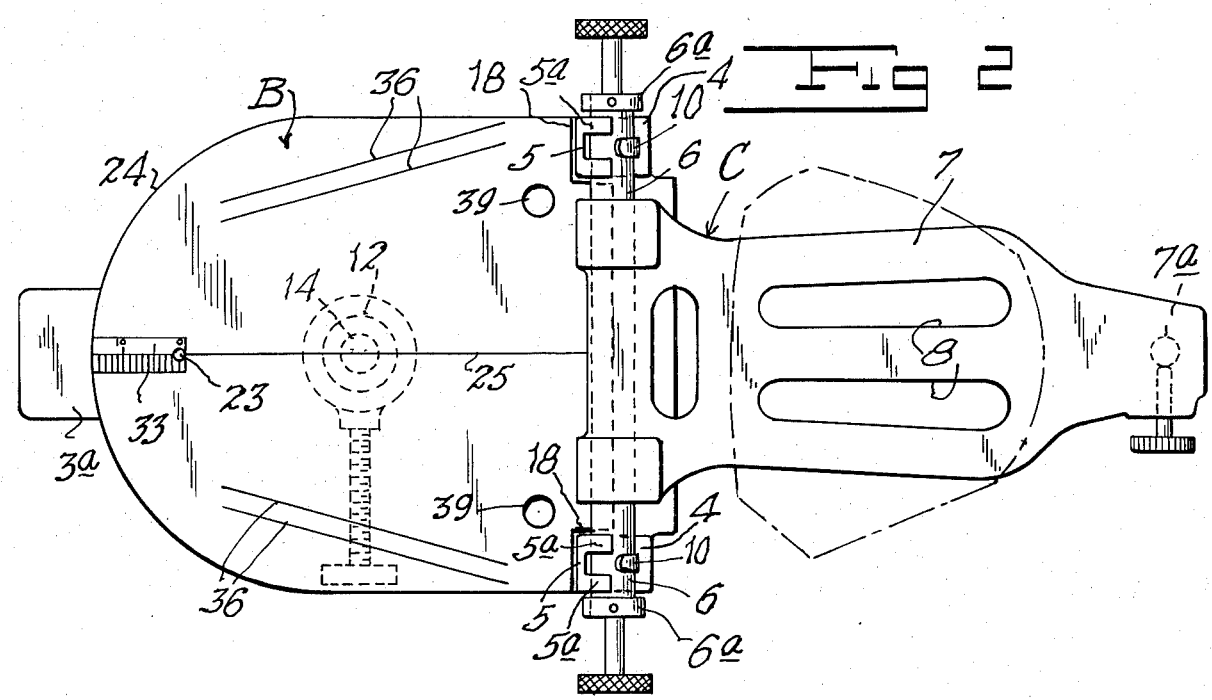
FIG. 2 is a top plan view of the instrument showing the upper member of the articulator swung away from the setup platform into horizontal position and with the dental cast omitted.

Projecting upwardly from the platform are two uprights or posts 4 at the upper ends of which are seats 5 to separably receive the end portions of the pivot shaft or trunnions 6 of the upper member C of a simple dental articulator. The articulator member includes a plate-like body portion 7 that has one end rigidly attached to the shaft or trunnions so the body portion can be swung selectively into overhanging relation to or away from the setup platform as shown by solid lines and by dotted lines, respectively, in FIG. 1, and said body portion has slots 8 therein to receive plaster 9 for mounting a cast on the articulator member as shown in FIG. 1. As shown, each seat 5 opens upwardly and rearwardly and has two spaced fingers 5a, and a leaf spring 10 has one end secured in the corresponding post with its other end normally biased into a position transverse of the seat and between said fingers, as shown in FIGS. 1 and 2, so that by flexing said spring as shown by dot and dash lines, the shaft or trunnion can be inserted into and removed from the seat, and normally the spring will releasably hold the shaft in the seat. Desirably, adjustable stop means such as collars 6a are provided on the shaft or trunnions to abut the corresponding seats and hold the articulator against lateral movement. Also, the front leg 3 desirably has a lateral projection 3a to accommodate articulators with incisal pin rods 7a.

The setup platform B has a tubular internally threaded shaft 12 projecting approximately centrally from its bottom side and vertically slidable in the socket 13 of an elongated boss 13a projecting approximately centrally from the bottom side of the main platform 1; and an adjusting screw 14 coacts with threads 15 in the shaft 12 and has a swivel connection 16 with the end of the socket. The screw has a finger piece 14a for rotating the screw to raise and lower the set-up platform; and a set screw 17 is threaded in the boss to releasably engage and hold the shaft 12 in the desired adjusted position. To hold the shaft 12 and the platform against rotation, the rear end portion of the platform extends between and abuts the posts 4 clearance for which is provided by notches 18 in the platform.

To facilitate the mounting of a dental cast in the proper horizontal position on the upper member of the articulator, a mounting jig E is provided. The generally accepted theory that the anterior papilla F and the hamular notches G are in a horizontal constant, is utilized in constructing the jig. As shown, the jig includes a support bar 19 having an index pin 20 fixedly mounted at one end thereof to contact the papilla, and a cross bar 21 adjustable longitudinally of the support bar with limited pivotal movement, to set in the hamular notches. The pin 20 projects from one side of the support bar and has a pointed end to contact the papilla, and at the other side of the support bar is a locating stud 22 coaxial and preferably integral with the pin to be removably inserted into an index hole 23 in the setup platform located near the front edge 24 and on the longitudinal center line 25 of said platform that is perpendicular to the common axis of said bearing seats.

The cross bar 21 has one edge beveled at 26 to accurately seat in the hamular notches, and its opposite edge 27 has a notch 28 which loosely receives the support bar which in turn has a longitudinal slot 29 through which slidably passes a headed screw 30 that is screwed into the cross bar at the base of said notch to slidably and pivotally connect the cross bar to the support bar. With this construction the cross bar can be moved toward and away from the index pin according to the distance between the papilla and the hamular notches and accurately seated in the notches. The second-mentioned edge 27 of the cross bar is flat and straight to set on the setup platform, and the end portion of the support bar that carries the index pin is offset from the main portion so that said flat edge 27 of the cross bar and the corresponding side 31 of said offset end portion are in a common flat plane, and the point of said index pin and the beveled edge of the cross bar are in a common flat plane that is parallel to the first-mentioned plane.

Figure 4:
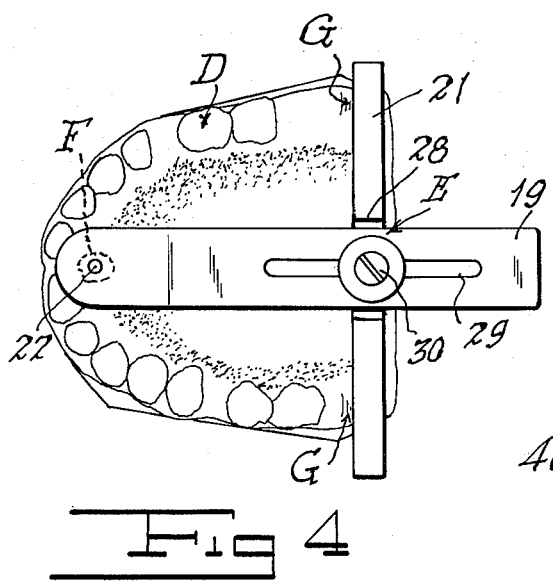
FIG. 4 is a top plan view of a dental cast and the mounting jig attached thereto.
Figure 5:
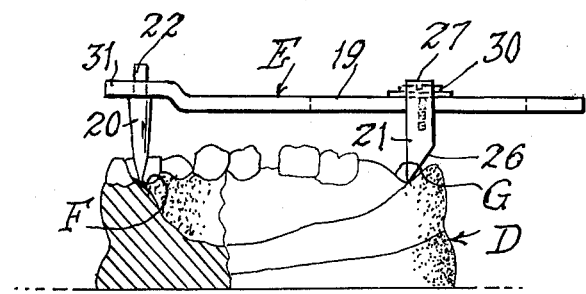
FIG. 5 is a side elevational view of the assembled cast and jig with portions of the cast broken away and shown in the section.

Preliminary to mounting the cast, the operator should with a pencil mark the center of the papilla, the deepest part of the hamular notches, and the center of the cast at the palatal end as indicated at 32. Then place the cross bar in the hamular notches, center the support bar on the cast by alining its slot with the mark at the palatal end of the cast, place the point of the index pin on the mark at the center of the papilla, and then seal the jig to the cast with dental sticky wax, preferably applied at the points of contact of the index pin and the cross bar with the papilla and the hamular notches, respectively. FIGS. 4 and 5 show the assembled cast and jig.

Then place the assembled cast and mounting jig on the setup platform, inserting the stud 22 of the index pin into the index hole 23 and lining up the center mark 32 of the cast with the center line 25 of the platform. Connect the upper member C of the articulator to the posts 4, adjust the platform to the proper position, place a mass of soft dental plaster on the exposed side of the cast and press the slotted plate of the articulator into the plaster so the plaster is squeezed into the slots 8 according to known practice, as indicated at 9, and allow plaster to harden as shown in FIGS. 1 and 3, thereby mounting the cast on the articulator member.

Thereafter, the mounting jig is removed and the articulator member with the cast thereon may be removed and reassembled with the lower member of the articulator on which a lower of mandible cast may be mounted with proper bite registration in the usual manner.

The invention also provides on the setup platform, a gauge, scale or ruler 33, preferably in millimeters, with the index hole 23 located at the zero mark which will measure the distance from the papilla to the incisal edge of the front teeth, for example, after the jig has been removed, and upon elevation of the platform into approximate contact with the cast mounted on the articulator member.

The invention also provides a vertical gauge, scale or ruler 34 on one post 4, also preferably with markings in millimeters, and the platform has a mark 35 on its edge correlated with the gauge 34 and disposed at the zero mark of the gauge when the platform is at its lowest position, whereby to indicate the degree of elevation of the platform.

In use of the invention, in addition to functions already described, the length of the front central teeth can be recorded by raising the platform to contact the front central teeth and noting the position of the platform on the gauge 34. The two central incisors are the most important teeth from the esthetic standpoint; and if their original position can be recorded and duplicated, then the original esthetics can be restored even if all the teeth have been removed surgically.

In edentulous cases a "smiling line" can be established. After setting the two central teeth the movable platform is raised tilting the model cast front up; and if laterals and cuspids are now set to the platform, the effect in the mouth will appear that the laterals are shorter than the centrals and the cuspids are shorter than the laterals, thus following the corners of the mouth as they rise when smiling.

The occlusal plane can also be established in edentulous cases. In normal jaw relation, the posterior ridges are parallel and by bringing the setup platform parallel to the ridges and setting the posterior teeth to the platform, the occlusal plane will be correct.

In accordance with the invention, two parallel posterior diagonal lines 36 are provided on the platform at each side of the center line 25, as guides to establishing the buco-lingual position of the posterior teeth on both sides of the mouth, the two lines on one side being spaced the same distance as the lines on the other side from said centerline and being in divergent relation to the lines on the other side from the center of the front edge 24 of the platform.

The invention can also be utilized in diagnosing natural posterior teeth. The plane of occlusion can be analyzed by raising the setup, platform and the extent of protrusion, if any, can be evaluated and a judgment can be made by the dentist whether the reduction of the occlusal extrusion can be accomplished, either by grinding or extraction of the involved teeth. The position of the platform may also indicate that depressed teeth can be lengthened to the surface of the platform to correct the plane of occlusion.

The invention can also be used in conjunction with two upper members of the same type of articulator for mounting a diagnostic model on one member and for mounting a working model on the other member, so that both models will be in the same position relative to the hamular notches and the anterior papilla.

In connection with articulators wherein both a model and the mounting plaster can be removed without breaking the plaster, it is not necessary to use two upper members because the two models can be mounted interchangeably on the same articulator member.

Figure 6:
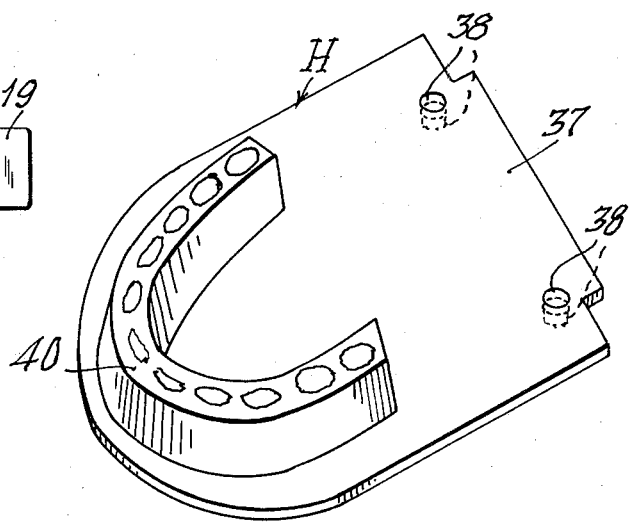
FIG. 6 is a perspective view of an indexing plate for use in making a record of occlusal and edentulous areas with wax.

The instrument can also be used to mount on the articulator member dental casts that lack the landmarks such as hamular notches and papilla. For this purpose an indexing jig H (FIG. 6) is provided, comprising a flat plate 37 having two studs 38 to removably fit in a hole 39 on the rear portion of the platform to support a body of dental wax 40 in which a record or index of the maxillary occlusal and edentulous areas can be made from a study model having all the essential landmarks, so that another cast, such as a working cast, can be properly mounted by positioning it in said wax index areas while the cast is being attached to the articulator member by the plaster.

Other uses of the invention will occur to those skilled in the art of dentistry, and modifications and changes in the details of construction of the instrument or appliance will be found to lie within the purview of the invention and the scope of the appended claims.

I claim:

1. A dental setup guide and diagnostic instrument comprising a frame having legs, a setup platform mounted on said frame for vertical movement and having a horizontal flat upper surface, means to vertically adjust said platform including a shaft projecting centrally from the bottom of said platform and vertically slidably mounted in a guide fixed on said frame and means manually movable on said frame and coactive with said shaft to move said platform up and down, horizontally spaced and alined bearing seats on said frame above and posteriorly of said setup platform to removably receive and pivotally support the pivot trunnions of the upper member of an articulator, providing for selective mounting and removal of an articulator member into and from said seats, respectively, for swinging of said articulator member downwardly toward and upwardly away from said platform, and for vertical movement of said platform toward and away from said articulator member.

2. The dental setup guide and diagnostic instrument defined in claim 1 wherein the means to vertically adjust said platform comprises an internally screwthreaded shaft projecting centrally from the bottom side of said platform, a boss on said frame having a socket slidably receiving said shaft, an adjusting screw swivel-connected to said boss and screwed into said shaft, there is means preventing rotation of said shaft and platform, and a set screw in said boss to clamp said shaft in adjusted position.

3. The dental setup guide and diagnostic instrument defined in claim 1 wherein said frame has vertical posts each carrying one of said bearing seats, and one of said posts and said platform have correlated gauge marks to indicate the distance of movement of said platform.

4. The dental setup guide and diagnostic instrument defined in claim 1 with the addition of a mounting jig comprising a support bar, an index pin fixedly mounted in and projecting from one side of said support bar to contact the anterior papilla of a dental cast, a stud projecting from the opposite side of said support bar coaxially with said index pin, said setup platform having a centerline on its flat surface perpendicular to the common axes of said bearing seats and a hole on said line to removably receive said stud, a cross bar having one narrow edge and an opposite wider flat edge mounted on said support bar for slidable adjustment longitudinally of said support bar and for limited pivotal movement relatively to said support bar, providing for setting said narrow edge of said cross bar in the hamular notches with the index pin in contact with the papilla of a dental cast and with said wide flat edge of said cross bar and said stud facing upwardly.

5. The dental setup guide and diagnostic instrument defined in claim 4 with the addition of a gauge scale on said platform extending from said hole along said centerline toward the front or anterior edge of the platform to measure the distance from the papilla to the incisal edge of the front teeth.

6. The dental setup guide and diagnostic instrument as defined in claim 1 with the addition of an articulator member comprising a plate having rigidly connected pivot trunnions seated in said bearing seats and having slots to receive mounting plaster for mounting on said member a dental cast setup on said platform.

7. The dental setup guide and diagnostic instrument as defined in claim 4 wherein said jig is adapted to be separably secured on said dental cast by dental sticky wax at the points of contact of said pin and said cross bar with the papilla and the hamular notches respectively, and the assembly is adapted to be set up on said platform with said stud inserted in said hole and the second-mentioned wide flat edge of the cross bar set on said flat surface of the platform.

8. The dental setup guide and diagnostic instrument as defined in claim 7 with the addition of an articulator member comprising a plate having rigidly connected pivot trunnions seated in said bearing seats and having slots to receive mounting plaster for mounting on said member a dental cast setup on said platform.

9. The dental setup guide and diagnostic instrument as defined in claim 1 wherein said platform has a flat upper surface on which is a centerline perpendicular to the common axes of said bearing seats, and said horizontal flat surface also has two parallel posterior diagonal lines at each side of said center line, the two lines on each side being spaced the same distance from said center line and the two lines on one side being in divergent relation to said two lines on the other side from the front of the platform, to serve as guides to establishing the buco-lingual position of the posterior teeth on both sides of the mouth.

10. The dental setup guide and diagnostic instrument defined in claim 1, with the addition of an indexing jig comprising a plate to support a body of dental wax to receive record impressions of the occlusual and edentulous areas from a study model having the essential landmarks such as papilla and hamular notches, said plate having studs on its bottom side and said platform having holes to removably receive said studs for separably positioning said plate on the platform.

* * * * *